March 4, 1924.

L. MILLER

SPEED REGULATOR SYSTEM

Filed Sept. 2, 1921

WITNESSES:

INVENTOR
Leonard Miller
BY
ATTORNEY

March 4, 1924.

L. MILLER

SPEED REGULATOR SYSTEM

Filed Sept. 2, 1921    3 Sheets-Sheet 2

1,485,409

WITNESSES:

INVENTOR
Leonard Miller
BY
ATTORNEY

March 4, 1924.

L. MILLER

SPEED REGULATOR SYSTEM

Filed Sept. 2, 1921

WITNESSES:

INVENTOR
Leonard Miller
BY
ATTORNEY

Patented Mar. 4, 1924.

1,485,409

UNITED STATES PATENT OFFICE.

LEONARD MILLER, OF MANCHESTER, ENGLAND, ASSIGNOR TO WESTINGHOUSE ELECTRIC & MANUFACTURING COMPANY, A CORPORATION OF PENNSYLVANIA.

SPEED-REGULATOR SYSTEM.

Application filed September 2, 1921. Serial No. 497,920.

*To all whom it may concern:*

Be it known that I, LEONARD MILLER, subject of the King of Great Britain, and a resident of Chorlton-cum-Hardy, Manchester, in the county of Lancaster, England, have invented a new and useful Improvement in Speed-Regulator Systems, of which the following is a specification.

My invention relates to regulator systems and it has special relation to a system for maintaining constant the speed ratio between a plurality of rotatable members.

One object of my invention is to provide a regulator system of the above-indicated character that comprises a balanced control element which is subject to the operating conditions of the controlled dynamo-electric machine and the unbalance of which actuates a motor-operated rheostat to control said machine.

Another object of my invention is to provide a regulator system of the above-indicated character having a Wheatstone-bridge control element, one arm of which comprises a condenser that is controlled in accordance with the operation of the controlled motor.

A still further object of my invention is to provide a regulator system of the above-indicated character which shall be simple and economical in construction and efficient and stable in operation.

The present invention is illustrated as applied to a motor that receives a normally constant excitation, the value of which is increased or diminished, by means of a device operated in accordance with the motor speed, to produce a counter-acting influence upon changes in the speed of the motor. More specifically, a contact-making device is rotated by the propelling motor to control the successive charging, discharging and reverse-charging of a condenser. A condenser operated in this manner functions somewhat as an ohmic resistance, the value of which is varied in accordance with variations in the rate of charging, discharging and reverse-charging. The condenser constitutes one arm of a Wheatstone bridge, the other arms of which include a fixed resistor and adjustable resistors. The center, or zero, arm of the Wheatstone bridge includes an ammeter control element for the motor of a motor-operated rheostat that is included in circuit with the field-magnet winding of the main motor. Accordingly, any unbalance in the Wheatstone bridge will actuate the ammeter to control the motor-operated rheostat. When the Wheatstone bridge becomes again balanced, the ammeter will operate to break the circuit to the rheostat motor.

Reference may now be had to the accompanying drawings, wherein—

Figure 1:
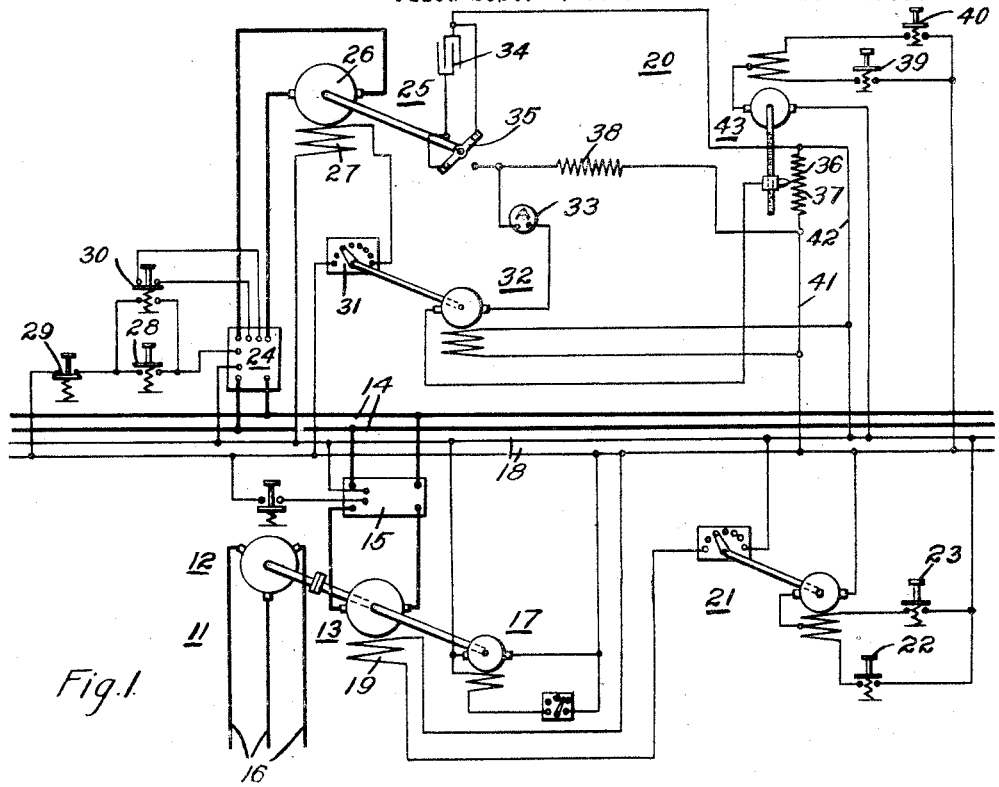
Figure 1 is a diagrammatic illustration of circuits and apparatus embodying my invention in its simplest form.

Referring to Fig. 1, a motor-generator set 11, comprising a motor 12 and a generator 13, is illustrated as supplying energy to bus bars 14 through a switch panel 15. The motor 12 is connected to supply conductors 16. A separate exciter 17 is driven by the motor-generator set 11 and is connected to constant-voltage bus bars 18. The field-magnet winding 19 of the generator 13 is also connected to the bus bars 18 and has included in circuit therewith a motor-operated rheostat 21 for the purpose of varying the excitation of the generator 13. The motor operated rheostat is adapted to be controlled at will by means of push buttons 22 and 23 to increase or decrease the resistance in the circuit of the winding 19.

A main motor 25, comprising an armature 26 and a field-magnet winding 27, and the speed of which is to be maintained constant, is connected to the bus bars 14 through a switch panel 24. Push buttons 28, 29 and 30 are provided for respectively starting, stopping and "inching" the main motor.

Included in circuit with the field-magnet winding 27 of the main motor 25 is a rheostat 31 which is operated by a motor 32 adapted to be excited from the bus bars 18. Motor 32 is controlled in its operation by means of an ammeter 33 that is located in the zero or center arm of a Wheatstone bridge 20.

The arms of the Wheatstone bridge respectively comprise a condenser 34, variable impedance devices 36 and 37 and the fixed impedance device 38. Condenser 34 is adapted to be charged, discharged and reverse-charged by means of a rotary-contacting device 35, coupled to the shaft of the main motor 25 and operated in accordance with the speed thereof. The impedance devices 36, 37 and 38 are here illustrated as ohmic resistors. The variable resistors 36 and 37 are controlled by a compound-wound motor 43, connected to bus bars 18 and controlled at will by means of push buttons 39 and 40. As illustrated, the Wheatstone bridge 20 is energized from the constant-voltage bus bars 18 through conductors 41 and 42.

The operation of the system of Fig. 1 is substantially as follows:—

The successive charging, discharging and reverse-charging of the condenser 34 will cause it to act like a resistance device, and the ohmic value thereof depends upon the rate of the charging, discharging and reverse-charging, which, in turn, directly depends upon the speed of the controlled motor. Accordingly, when once the speed of the motor has been set and a balance obtained upon the Wheatstone bridge by adjustment of the resistors 36 and 37, no current will flow in the ammeter 33. However, if there is an increase or a decrease in the speed of the motor 25, the balanced condition of the Wheatstone bridge will be disturbed by reason of the change in the rate of charging and discharging of the condenser 34. Hence, a current will flow through the ammeter and the rheostat motor 32 in a direction to vary the field excitation of the main motor 25 to correct for the speed variation. As soon as motor 25 returns to normal speed, the Wheatstone bridge will again be balanced, which will de-energize motor 32.

Figure 2:
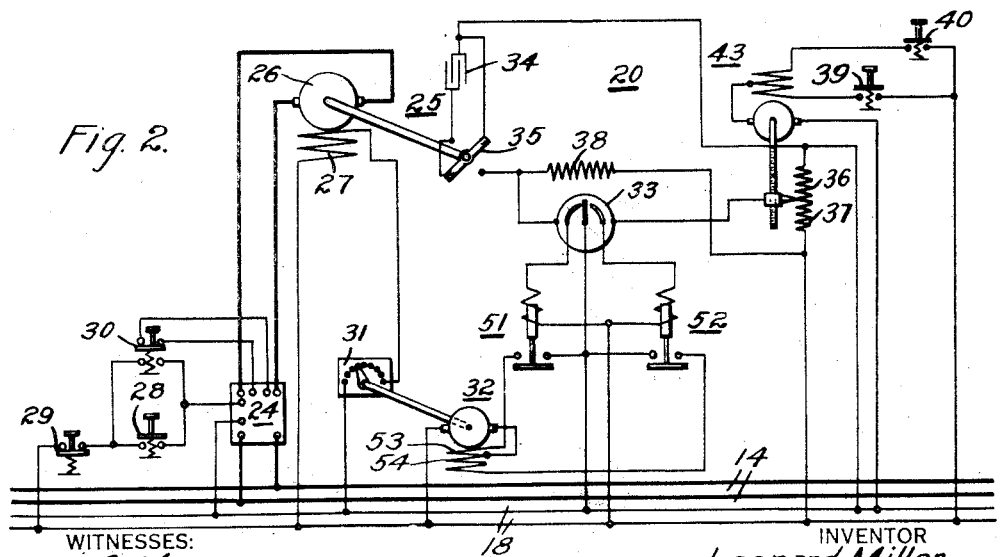
Fig. 2 is a modification of the system of Fig. 1.

Fig. 2 illustrates a system similar to the system of Fig. 1, except for the addition of the relays 51 and 52. Accordingly, duplicate parts have been given the same reference numerals and it has been deemed unnecessary to illustrate the motor-generator set 11 with its connections.

The relays 51 and 52 operate the motor 32 in the one or the other direction to control the rheostat 31. In this system, the ammeter 33 selectively completes the circuit to magnets 51 and 52 to energize either field-magnet winding 53 or field-magnet winding 54 to operate the motor 32 in the one or the other direction, as described in the system of Fig. 1. It will be noted that motor 32 is not included in the zero arm of the Wheatstone bridge.

Figure 3:
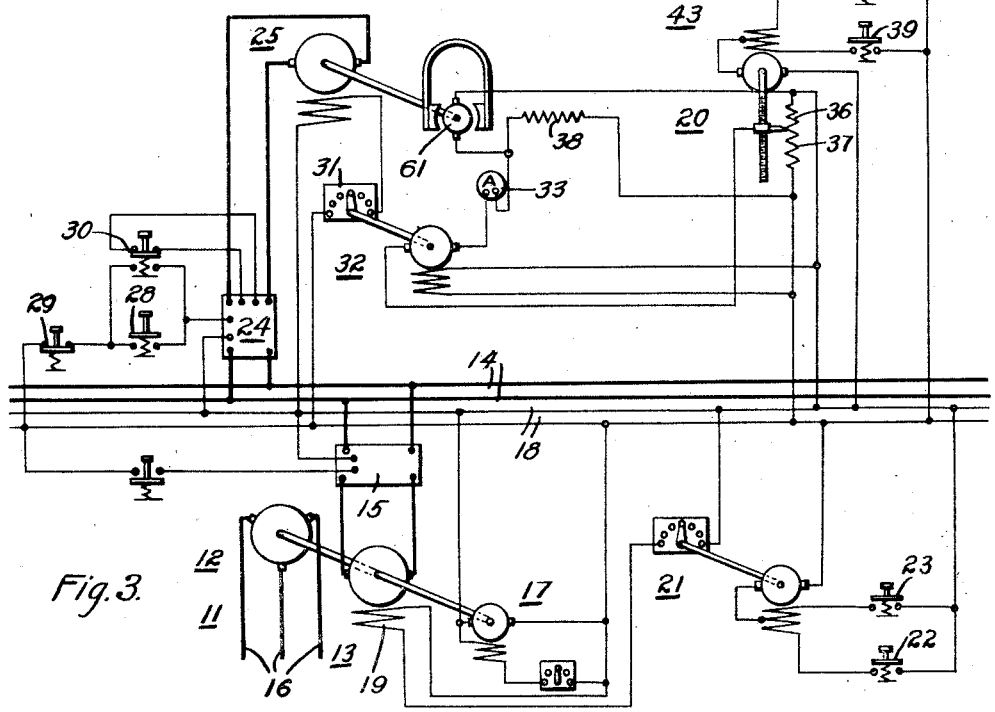
Fig. 3 is a modification of the system of Fig. 1, illustrating the use of a volt generator instead of the variable condenser of Figs. 1 and 2.

The system of Fig. 3 illustrates the use of a magneto machine 61 connected to the shaft of the main motor 25, instead of the contactor 35 and associated condenser 34.

It will be understood that the magneto volt generator 61, being operated in accordance with the speed of the motor 25, will function in the same manner as the condenser mechanism 34 and 35 of Fig. 1. Also, as in Fig. 1, the motor 32 is included in the zero arm of the Wheatstone bridge.

Fig. 3 illustrates the use of the relays 51 and 52 in the system of Fig. 3 to control the operation of the rheostat motor 32 in accordance with an unbalance of the Wheatstone-bridge controlling element, of which the magneto generator 61 constitutes one arm.

Figure 4:
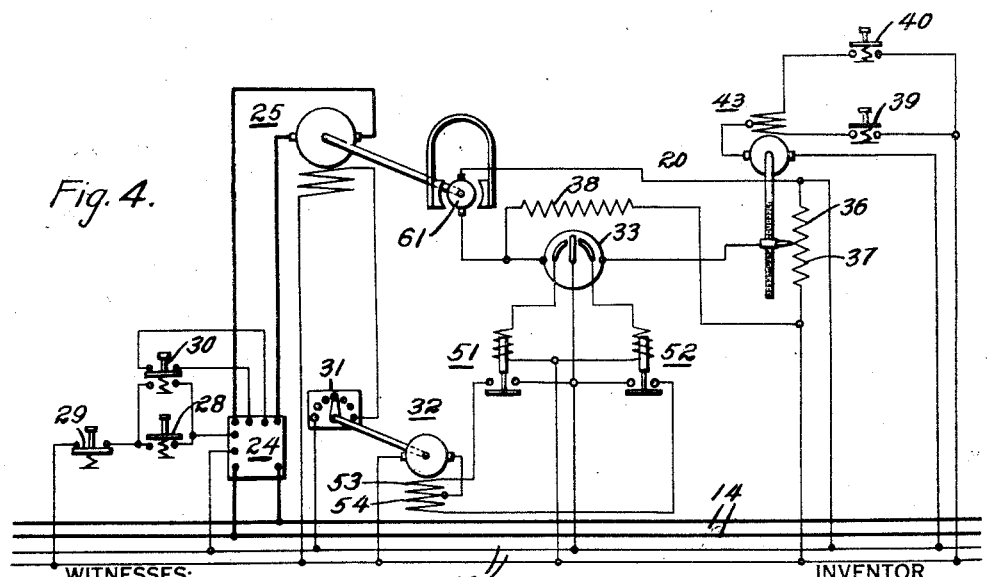
Fig. 4 is a modification of the system of Fig. 3.
Figure 5:
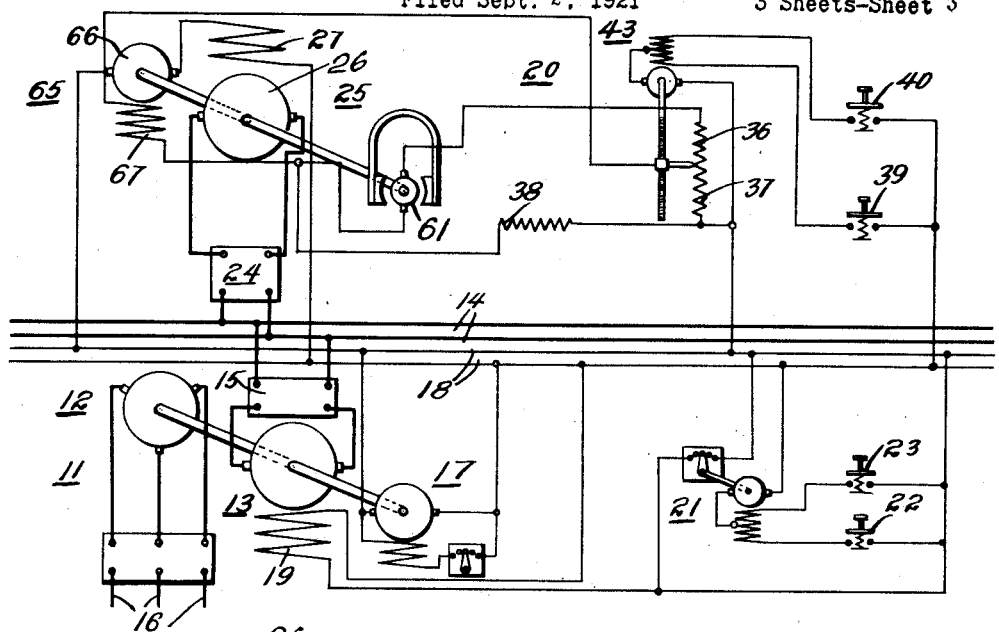
Fig. 5 is a modification of the system of Fig. 1, illustrating the use of a reversible booster generator.

In the modification shown in Fig. 5, a reversible booster 65 is substituted for the motor-operated rheostat 31, 32, in the circuit of the field-magnet winding of the main motor. The armature 66 of the booster 65 is connected in series with field-magnet winding 27 of the main motor 25 and the booster field-magnet winding 67 is connected in the zero arm of the Wheatstone-bridge control element. The remainder of the system is as illustrated in Figs. 3 and 4, employing the volt generator 61 as one arm of the Wheatstone-bridge control element.

With the system of Fig. 5, under conditions of balance in the Wheatstone-bridge, no current will flow in the booster field-magnet winding 67. However, any variation in speed of the main motor will unbalance the Wheatstone-bridge to cause current to flow in the one or the other direction in the field-magnet winding 67 so that the booster is made to give a positive or a negative boost to the field-magnet winding 27 of the main motor 25.

Figure 6:
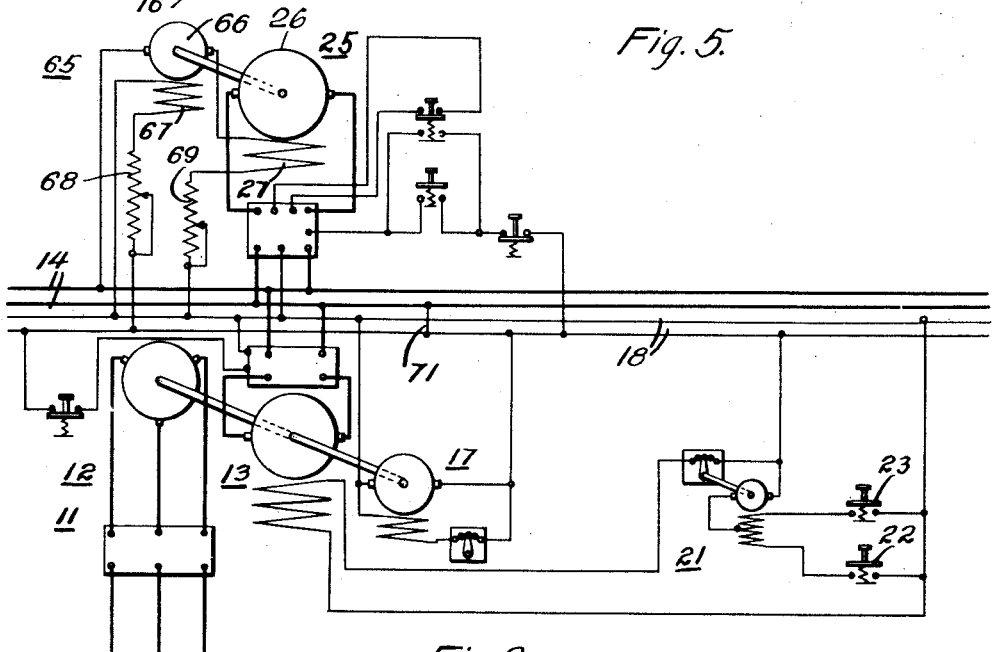
Fig. 6 is a modification of the system of Fig. 1, illustrating the use of a compound booster generator.

In the arrangement illustrated in Fig. 6, the booster 65 is not reversible. The booster field-magnet winding 67 is connected to the bus bars 18 through a variable resistor 68. The circuit through the armature 66 of the booster 65 extends from one of the main bus bars 14, through booster armature 66, main field-magnet winding 27, and a variable resistor 69, to one of the bus bars 18. The circuit then extends, through the exciter 17, opposite bus bar 18, conductor 71, opposite bus bar 14 and armature 26 of the main machine, to the bus bar 14, to which the booster armature 66 is connected.

From the foregoing connections, it will be apparent that the booster generator is excited from the constant-voltage source and is operated in such manner that the field-magnet winding 27 of the main motor is excited by the difference between the booster voltage added to the exciter voltage, on the one hand, and the voltage of the main generator, on the other hand, so that, normally, the booster neutralizes the main generator voltage, and the field 27 is excited only by the constant-voltage exciter 17.

In the arrangement exemplified in Fig. 6, if the speed of the motor 25 varies, the booster 65 will generate a correspondingly smaller or larger voltage to strengthen or weaken the field 27 of the motor 25 and thus restore the normal operating speed of the motor.

Although the control of only one motor has been illustrated and described, it will be understood that the invention is equally applicable to control a plurality of motors connected in parallel to the bus bars 14 and 18. The simultaneous control of the operating speed of all of the motors will be effected by the manipulation of the push buttons 22 and 23 to vary the excitation voltage for the motors. The speed of each individual motor may be varied by manipulation of the push buttons 39 and 40, as previously described.

Other modifications in the system and arrangement and location of parts may be made within the spirit and scope of my invention, and such modifications are intended to be covered by the appended claims.

I claim as my invention:—

1. In a regulator system adapted to maintain a predetermined operating condition, the combination with a translating device to be regulated, of a Wheatstone-bridge-control element therefor, the respective arms of which comprise a fixed-resistance unit, variable-resistance units, a variable condenser and a motor-control element.

2. In a regulator system adapted to maintain a predetermined operating condition, the combination with a translating device to be regulated, of a Wheatstone-bridge-control element therefor, the respective arms of which comprise a fixed-resistance unit, variable-resistance units, and a variable condenser.

3. In a regulator system adapted to maintain a substantially constant speed, the combination with a translating device to be so regulated, of a Wheatstone-bridge-control element therefor, the respective arms of which comprise a fixed-resistance unit, variable-resistance units, and a condenser controlled by said device.

4. In a speed-regulator system for an electric motor, the combination with means for varying the excitation of said motor, of a Wheatston-bridge-control element therefor having in one of its arms a device controlled by the motor, the effective resistance of which depends upon the motor speed.

5. In a speed-regulator system for an electric motor, the combination with means for varying the excitation of said motor, of a Wheatstone-bridge-control element therefor having one arm thereof embodying a condenser which is adapted to be charged, discharged and reverse-charged in accordance with the operation of the controlled motor.

6. In a regulator system, the combination with a dynamo-electric machine, means for controlling said machine, of a Wheatstone-bridge-control element therefor having one arm thereof embodying a condenser which is adapted to be charged, discharged and reverse-charged in accordance with the operating condition of said machine.

7. In a regulator system for an electric motor, the combination with a dynamo-electric machine, of a Wheatstone-bridge-control element therefor having one arm thereof including a condenser controlled in accordance with the operating condition of said machine.

8. In a speed-regulator system for an electric motor, the combination with means for varying the excitation of said motor, of a Wheatstone-bridge-control element therefor comprising fixed and variable ohmic resistors, and a condenser which is adapted to be charged, discharged and reverse-charged, and means for controlling said condenser in accordance with the speed of the motor.

9. In a regulator system, the combination with a dynamo-electric machine and means for controlling said machine, of a Wheatstone-bridge-control element therefor, the arms of which comprise fixed and variable impedance devices and a condenser, and means for controlling said condenser in accordance with the operation of said machine.

10. In a regulating system adapted to control the speed of a main motor, the combination with a motor-operated rheostat in the circuit of said main motor, of a Wheatstone-bridge-control element for the motor of said rheostat, comprising variable resistors, a fixed resistor, and means controlled in accordance with the speed of said main motor, whereby any variation in the speed of the main motor will unbalance the Wheatstone bridge, and means controlled in accordance with such unbalanced conditions to operate said rheostat motor to correct for the speed variation of the main motor.

11. In a regulating system adapted to control the operation of a dynamo-electric machine, the combination with a rheostat in the circuit of said machine, of a Wheatstone-bridge-control element therefor comprising variable impedance devices, a fixed impedance device and a device controlled in accordance with the operation of said machine, whereby any variation in the operation thereof will unbalance the Wheatstone bridge to control said rheostat to correct for the machine variation.

In testimony whereof, I have hereunto subscribed my name this sixteenth day of August, 1921.

LEONARD MILLER.